(12) United States Patent
Smith

(10) Patent No.: US 10,882,716 B1
(45) Date of Patent: Jan. 5, 2021

(54) ELONGATED MEMBER PULLING DEVICE

(71) Applicant: Noel Christian Smith, Lancaster, PA (US)

(72) Inventor: Noel Christian Smith, Lancaster, PA (US)

( * ) Notice: Subject to any disclaimer, the term of this patent is extended or adjusted under 35 U.S.C. 154(b) by 82 days.

(21) Appl. No.: 16/100,264

(22) Filed: Aug. 10, 2018

Related U.S. Application Data

(60) Provisional application No. 62/545,125, filed on Aug. 14, 2017.

(51) Int. Cl.
*B65H 75/44* (2006.01)
*H02G 11/02* (2006.01)

(52) U.S. Cl.
CPC ......... *B65H 75/4434* (2013.01); *H02G 11/02* (2013.01); *B65H 2701/34* (2013.01)

(58) Field of Classification Search
CPC ............ B65H 75/4434; B65H 2701/34; B65H 75/44; H02G 11/02
See application file for complete search history.

(56) References Cited

U.S. PATENT DOCUMENTS

| | | | | |
|---|---|---|---|---|
| 4,004,366 A * | 1/1977 | Berry | ...................... | A01K 73/06 43/27.4 |
| 4,343,443 A * | 8/1982 | Grounds | ................. | H02G 11/02 242/155 BW |
| 4,454,999 A * | 6/1984 | Woodruff | ............... | B65H 49/34 242/388.7 |
| 4,540,017 A * | 9/1985 | Prange | ................. | B65H 75/441 137/355.12 |
| 4,588,142 A * | 5/1986 | Malzacher | ......... | B65H 54/2812 242/390.5 |
| 4,616,791 A * | 10/1986 | Harvey | ................ | A01G 25/095 242/390.1 |
| 4,767,073 A * | 8/1988 | Malzacher | ......... | B65H 54/2812 242/397.3 |
| 5,330,122 A * | 7/1994 | Wood | .................. | B65H 54/2821 242/397.3 |
| 5,364,043 A * | 11/1994 | Linderoth | .......... | B65H 54/2857 242/397 |
| 5,385,314 A * | 1/1995 | Hughes | .............. | B65H 54/2866 242/397.3 |
| 6,951,345 B2 * | 10/2005 | Wilks | ....................... | B60D 1/36 242/397.5 |
| 2014/0070045 A1 * | 3/2014 | Robinson | ............... | B65H 57/18 242/566 |

* cited by examiner

*Primary Examiner* — Sang K Kim
(74) *Attorney, Agent, or Firm* — McNees Wallace & Nurick LLC

(57) ABSTRACT

An elongated member pulling device including a support surface and a reel assembly for rotatably carrying a take-up reel about a first axis for receiving an elongated member, the reel assembly rotatably carried by the support surface about a second axis. A guide device including a plurality of rollers defining a closed geometry for guiding the elongated member toward the reel assembly. In response to the elongated member being guidingly received through the guide device and rotatably collected by the take-up reel, the reel assembly being selectably oscillatingly rotatable about the second axis to permit even winding of the elongated member on the take-up reel.

20 Claims, 5 Drawing Sheets

ELONGATED MEMBER PULLING DEVICE

FIELD OF THE INVENTION

The present invention is directed to cable/rope pulling devices.

BACKGROUND OF THE INVENTION

Cable/rope pulling devices are widely used, for example for installing power distribution or communication lines. Such devices typically include a fixed take-up reel having an independent actuating arm for "level winding" or evenly distributing the cable/rope along the peripheral take-up surface of the reel, similar to a fishing reel. While generally adequate in operation, this reel/actuating arm arrangement requires the device, typically installed on the rear of a trailer, to be aligned with the direction of the power distribution or communication lines. That is, if the power distribution or communication lines extend transverse to the direction of the road, the trailer must also be similarly directionally oriented, potentially requiring the trailer to block a traffic lane. In addition, the independent actuating arm requires additional components, takes up space on the trailer, adding cost to the apparatus.

It would be desirable to have a cable/rope pulling device and method for collecting cable/rope that does not suffer from these deficiencies.

SUMMARY OF THE INVENTION

In one embodiment, an elongated member pulling device includes a support surface and a reel assembly for rotatably carrying a take-up reel about a first axis for receiving an elongated member, the reel assembly rotatably carried by the support surface about a second axis. A guide device includes a plurality of rollers defining a closed geometry for guiding the elongated member toward the reel assembly. The pulling device further includes, in response to the elongated member being guidingly received through the guide device and rotatably collected by the take-up reel, the reel assembly being selectably oscillatingly rotatable about the second axis to permit even winding of the elongated member on the take-up reel.

In another embodiment, an elongated member pulling device includes a trailer having a support surface and a reel assembly for rotatably carrying a take-up reel about a first axis for receiving an elongated member, the reel assembly rotatably carried by the support surface about a second axis. The pulling device further includes a guide device including two pairs of opposed rollers defining a closed rectangular geometry for guiding the elongated member toward the reel assembly, in which at least one pair of rollers is adjustable for adjusting a size of the closed rectangular geometry. The pulling device further includes in response to the elongated member being guidingly received through the guide device and rotatably collected by the take-up reel, the reel assembly being selectably oscillatingly rotatable about the second axis to permit even winding of the elongated member on the take-up reel. A rotational drive source includes a worm drive for oscillatingly rotatably driving the reel assembly.

In yet a further embodiment, a method of collecting an elongated member includes guiding an elongated member through a plurality of rollers defining a closed geometry toward a take-up reel and rotating the take-up reel about a first axis for receiving the elongated member. The method further includes simultaneously oscillatingly rotating the take-up reel about a second axis for permitting even winding of the elongated member on the take-up reel.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

The present invention provides an elongated member pulling device and method that results in a reduction in the number of components, is compact, operates at higher speeds, and is universally adaptable for use with existing pulling devices. The elongated member pulling device is compatible for use with the Spider® system of equipment, reels, rope, and accessories for the installation of distribution-class conductors.

Figure 1:
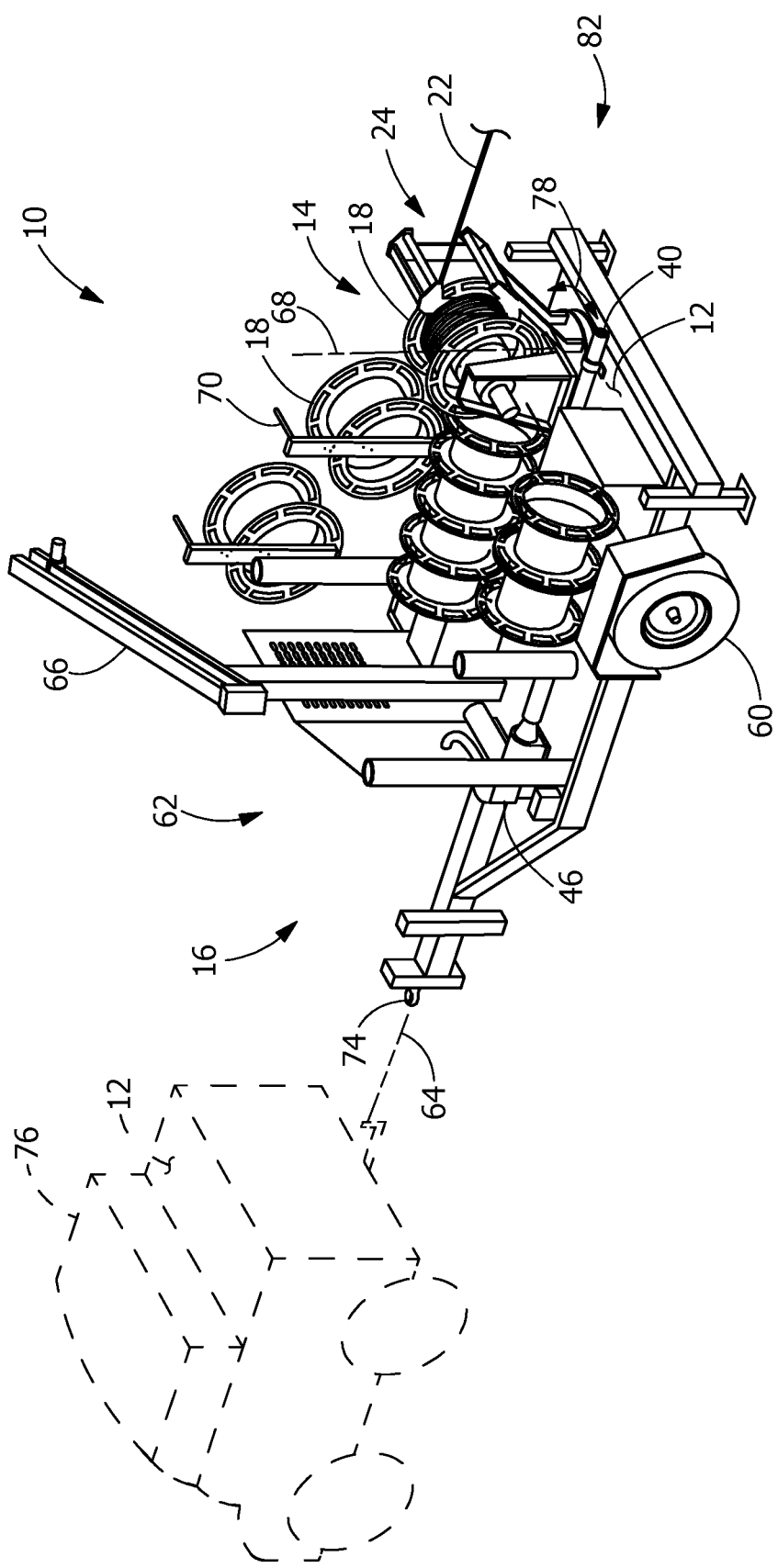
FIG. 1 is an upper perspective view of an exemplary elongated member pulling device.

As shown in FIG. 1, an exemplary elongated member pulling device 10 includes a support surface 12 that rotatably carries a reel assembly 14, which reel assembly 14 rotatably carries a take-up reel 18 for receiving an elongated member 22, such as a cable, rope, chain or other suitable elongated member, depending upon application. A crane 66 may be used to transfer take-up reel 18 that has been loaded with elongated member 22 as a result of take-up reel 18 being directed into rotational movement about axis 20 (FIG. 2) by drive source 46, to one or more storage reel receivers 70 supported by support surface 12. As further shown in FIG. 1, support surface 12 supports a drive source 46, such as a motor that is controllable by an operator 80 at an operator control region 62, such as providing a working fluid to a rotational drive source 40, such as a hydraulic motor for controllably positioning reel assembly 14. As shown, support surface 12 is part of a trailer 16 having an axis 64 that is rotatably carried by a pair of wheels 60 and includes a hitch 74 adapted for pulling trailer 16 by a motor vehicle 76. In one embodiment, as shown in FIG. 1, support surface 12 is a portion of a motor vehicle 76, such as a bed of a truck.

Figure 2:
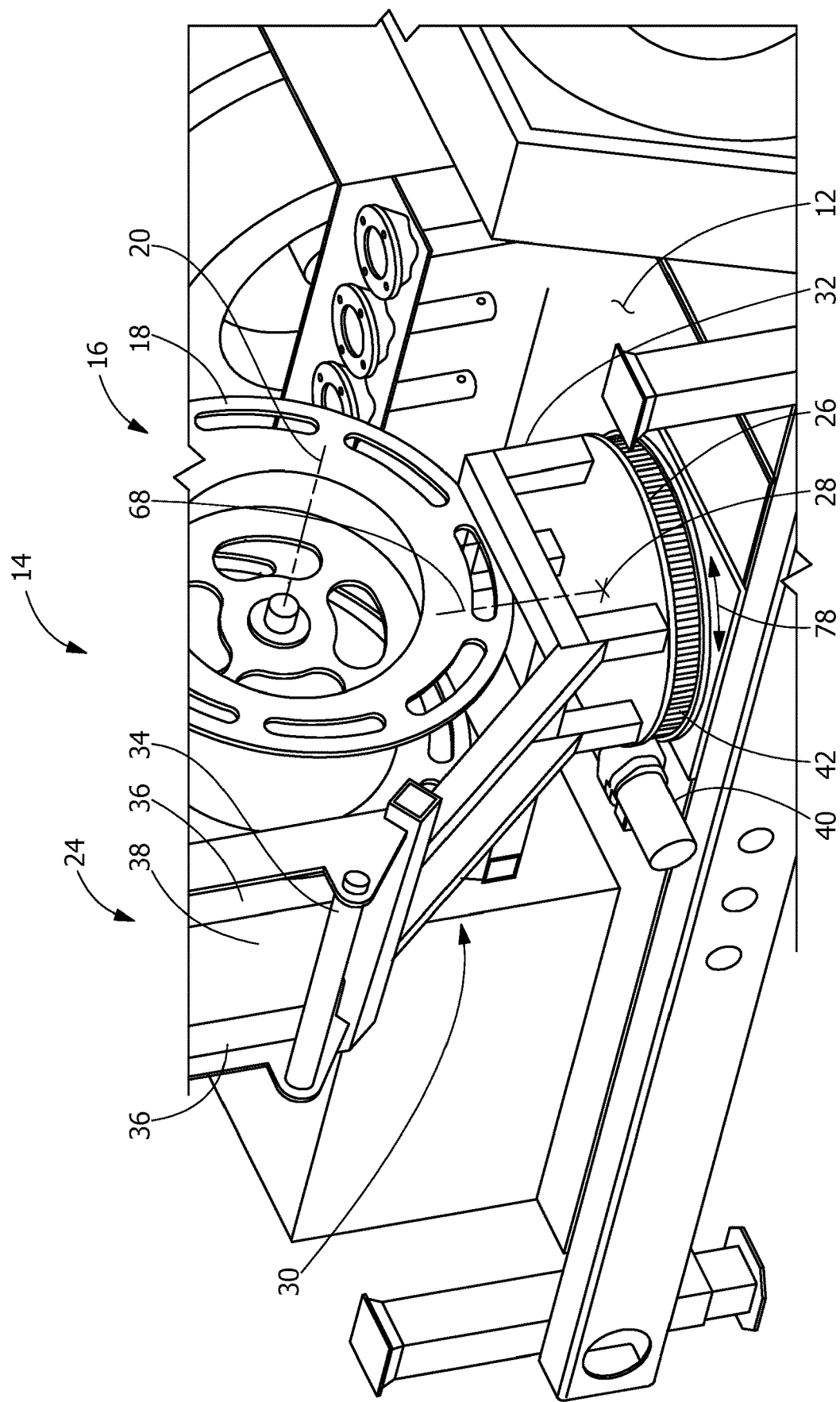
FIG. 2 is an enlarged, partial perspective view of an exemplary reel assembly.

As shown in FIG. 2, reel assembly 14, defining a turret or turret construction, is rotatably carried by support surface 12 about an axis 68. Axis 68 is coincident with a center 28 of a base 26 of reel assembly 14. Base 26 is rotatably carried by a bearing 42, such as a slew bearing and urged into rotational movement 78 by rotational drive source 40, such a working fluid drive source utilizing or including a worm drive. In one embodiment, rotational drive source 40 may be an electric motor, a belt drive, direct mechanical drive or other suitable drive source. Returning to FIG. 1, reel assembly 14 is positioned at an end on trailer 16 opposite hitch 74 with take-up reel 18 oriented to receive elongated member 22 that is positioned generally parallel with axis 64, which for purposes herein is referred to as a reference position 82. However, reel assembly 14 may be urged into rotational movement 78 relative to reference position 82 of support surface 12 of trailer 16 about axis 68 approximately 90 degrees in either direction, or a total of approximately 180 degrees relative to support surface 12. As a result, axis 64 of trailer 16 may be oriented or maintained in an orientation transverse to the direction of an extended length of elongated member 22 to be collected, such as from a row of power distribution poles, with take-up reel 18 being urged into rotational movement 78 about axis 68 to align take-up reel 18 of reel assembly 14 with the elongated member 22 to be collected. In one embodiment rotational movement 78 may be greater than 90° in either direction relative to axis 64.

Returning to FIG. 2, simultaneously with take-up reel 18 rotatably collecting elongated member 22 as a result of take-up reel 18 being urged into rotational movement about axis 20, rotational drive source 40 urges reel assembly 14 into oscillating rotational movement 78 about axis 68, permitting even winding of elongated member 22 on take-up reel 18, similar to operation or collection of line on a fishing reel, commonly referred to as even wind or level wind fishing reel that is well known by those having ordinary skill in the art. In other words, reel assembly 14 is rotated to properly orient take-up reel 18 to collect elongated member 22, with reel assembly 14 being additionally oscillatingly rotated to permit even winding of elongated member 22 on take-up reel 18. By utilizing a single, compact rotational drive arrangement for both orienting take-up reel 18 with elongated member 22 prior to operation of pulling device 10, as well as permitting even winding of elongated member 22 on take-up reel 18 during operation of pulling device 10, the number of components of pulling device 10 may be reduced, providing additional room for storage space or reducing the size of pulling device 10, and reducing the cost of pulling device 10.

Figure 5:
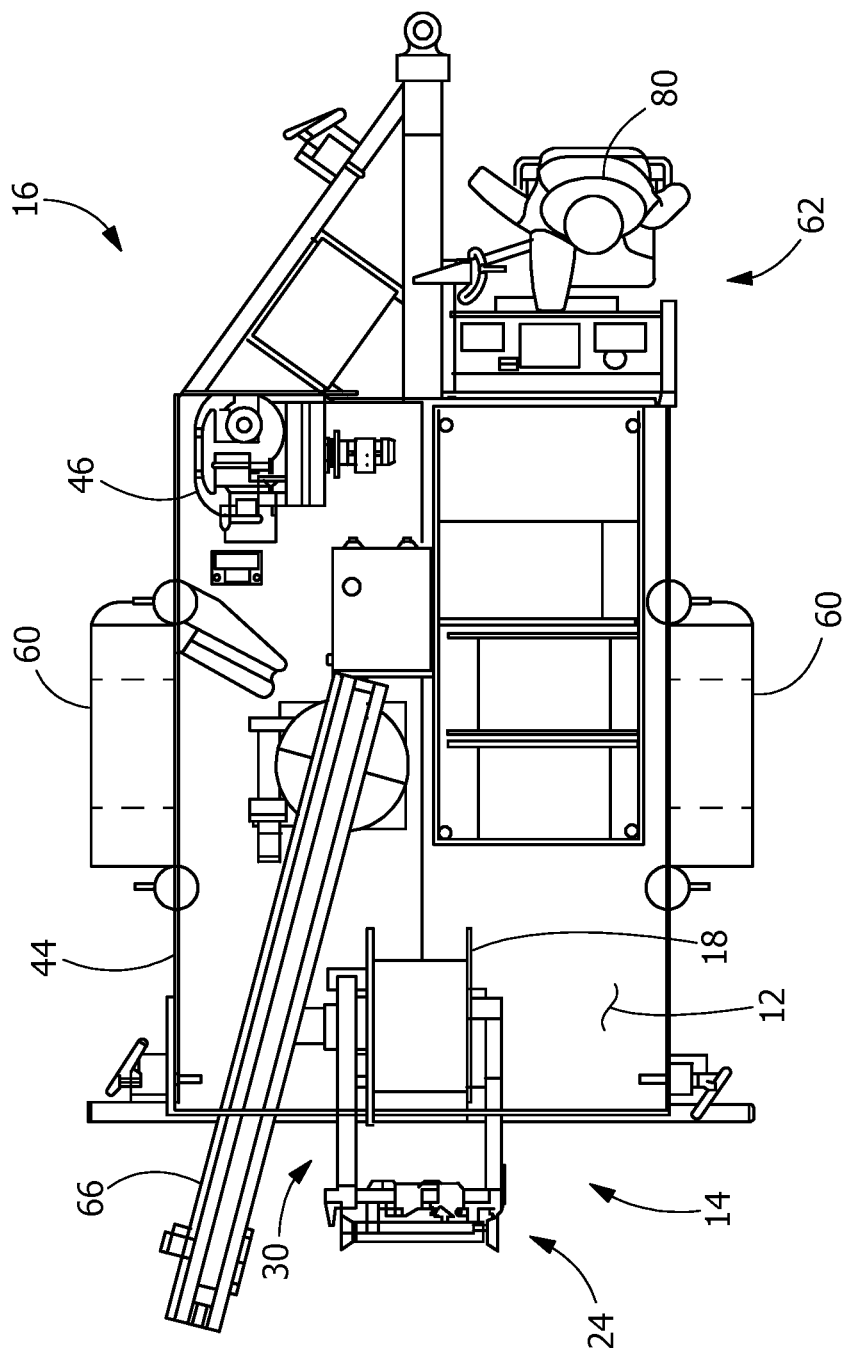
FIG. 5 is a plan view of the elongated member pulling device of FIG. 1.

As shown in FIG. 2, reel assembly 14 includes a frame 30 extending from and connected to base 26, which frame 30 including frame members 32. Frame 30 is connected to a guide device 24 including a plurality of rollers, such as rollers 34, 36 defining a closed geometry 38 for guiding elongated member 22 (FIG. 1) toward reel assembly 14. In other words, reel assembly 14 and guide device 24 form a single structure. Any number of rollers greater than two may be used to form closed geometry 38. For example, as further shown in FIG. 2, guide device 24 includes a pair of opposed horizontal rollers 34 (only one horizontal roller 34 shown in FIG. 2) and a pair of opposed vertical rollers 36, together defining a closed rectangle geometry 38. In one embodiment, opposed horizontal rollers 34 are adjustable, thereby adjusting a size of closed rectangular geometry 38, permitting pulling device 10 (FIG. 10) to be universally compatible with other pulling devices. In one embodiment, any one or more of the rollers defining the closed geometry may be adjustable, as appropriate for the application. Moreover, as shown in FIG. 5, guide device 24 is vertically positionable outside a footprint 44 of support surface 12, permitting collection of elongated member 22 from a direction vertically above, for example, from power distribution lines, and vertically below, for example, a below-ground installation or run of power distribution lines.

Figure 3:
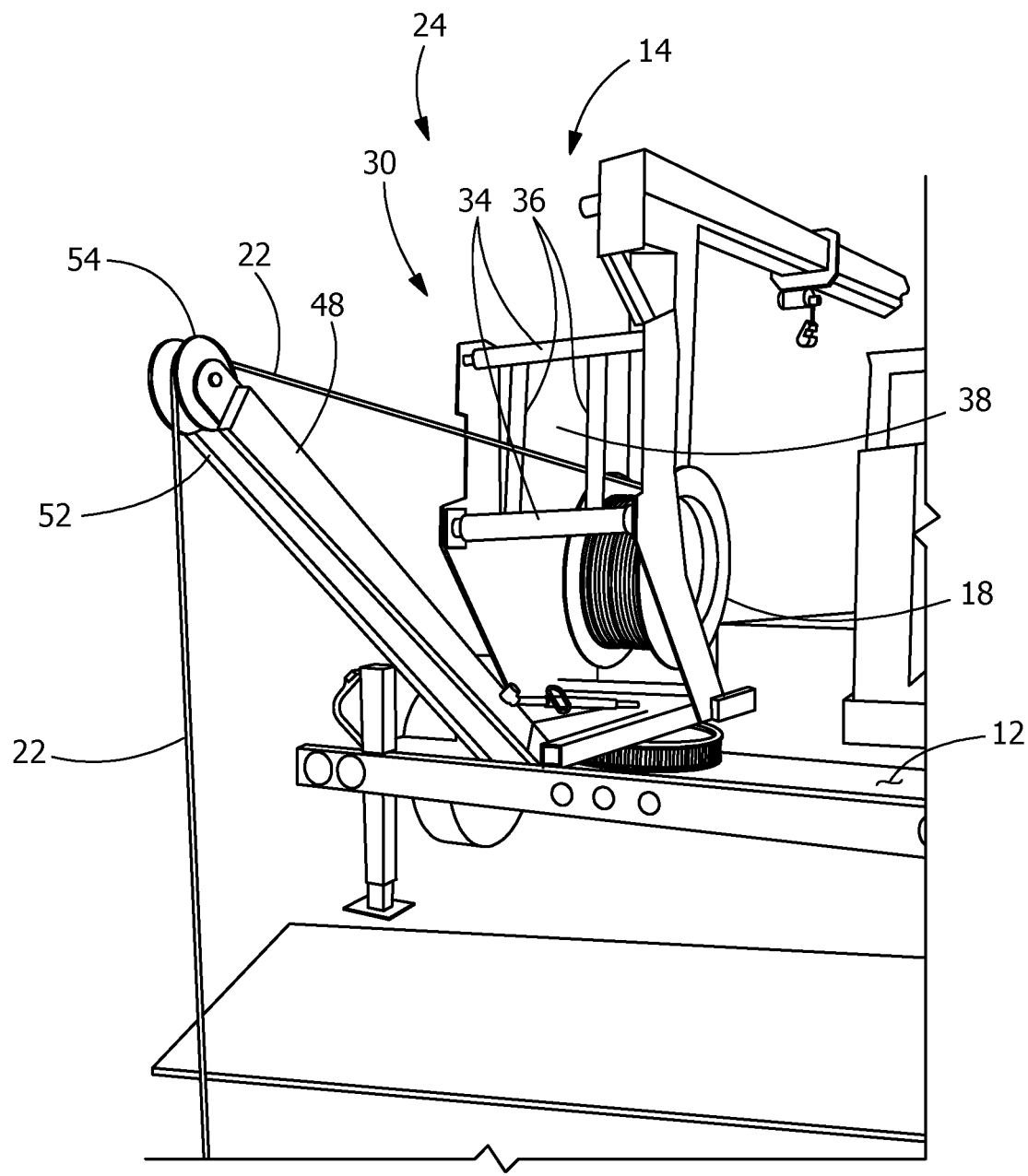
FIG. 3 is a forward-looking upper perspective view of an exemplary embodiment of the elongated member pulling device.
Figure 4:
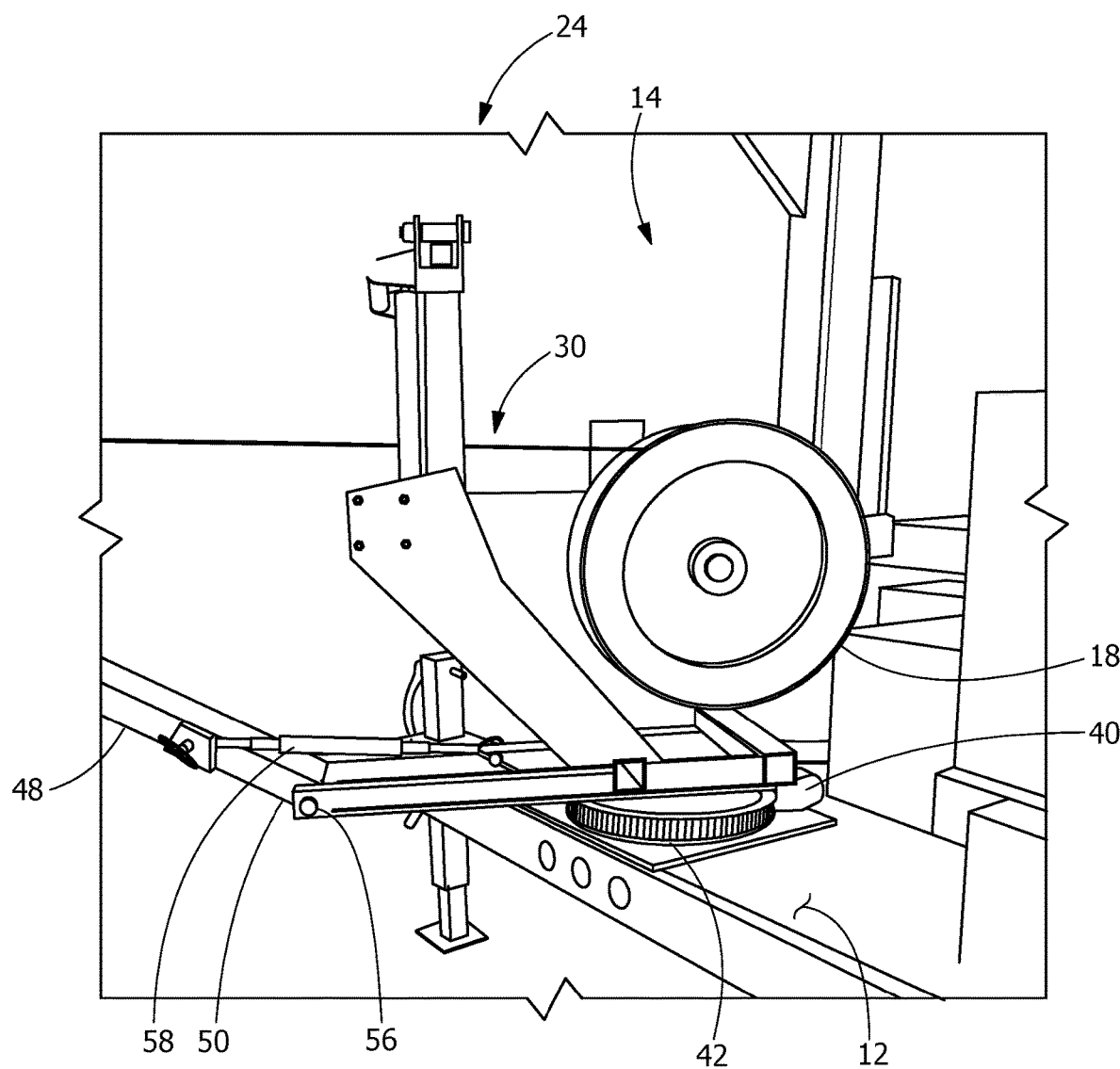
FIG. 4 is a laterally-looking upper perspective view of an exemplary embodiment of the elongated member pulling device of FIG. 3.

As shown in FIG. 3, an optional elongated support member 48 may be utilized to permit collection of elongated member 22 from a below-ground or run of power distribution lines. That is, elongated support member 48 permits pulling device 10 to be positioned a greater distance from an elongated member collection point 84 for reasons including in accessibility or for other reasons. As shown in FIG. 4, elongated support member 48 includes an end 50 having a pivotable connection 56 with frame 30 and a turnbuckle 58 pivotably connected between frame 30 and elongated support member 48 for permitting angular adjustment between elongated support member 48 and support member 12. Returning to FIG. 3, an end 52 opposite end 50 (FIG. 4) includes a rotatable guide member 54 for rotatably re-directing elongated member 22 from a position vertically below support surface 12 toward guide device 24.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An elongated member pulling device, comprising:
a support surface;
a reel assembly for rotatably carrying a take-up reel about a first axis for receiving an elongated member, the reel assembly rotatable about the support surface about a second axis extending through the take-up reel; and
a guide device comprising a plurality of rollers defining a closed geometry for guiding the elongated member toward the reel assembly;
wherein in response to the elongated member being guidingly received through the guide device and rotatably collected by the take-up reel, the reel assembly being selectably oscillatingly rotatable about the second axis to permit even winding of the elongated member on the take-up reel.

2. The pulling device of claim 1 further comprises a rotational drive source.

3. The pulling device of claim 2, wherein the rotational drive source includes a worm drive.

4. The pulling device of claim 1, wherein at least one roller of the plurality of rollers is adjustable for adjusting a size of the closed geometry.

5. The pulling device of claim 1, wherein the reel assembly and the guide device form a single structure.

6. The pulling device of claim 1, wherein the guide device includes two pairs of opposed rollers defining a closed rectangular geometry, wherein at least one pair of rollers is adjustable for adjusting a size of the closed rectangular geometry.

7. The pulling device of claim 1, wherein the reel assembly is rotatable approximately 180 degrees relative to the support surface.

8. The pulling device of claim 1 wherein the guide device is vertically positionable outside a footprint of the support surface.

9. The pulling device of claim 1 further comprises an elongated support member having a first end connected to the reel assembly and an opposed second end having a rotatable guide member, wherein at least the second end is vertically positionable outside a footprint of the support surface.

10. The pulling device of claim 9, wherein an angle between the elongated support member and the support surface is adjustable.

11. The pulling device of claim 1 further comprises a plurality of wheels for rotatably supporting the support surface.

12. The pulling device of claim 11, wherein the support surface is a portion of a trailer.

13. The pulling device of 11, wherein the support surface is a portion of a motor vehicle.

14. A method of collecting an elongated member as claimed in the pulling device of claim 1, comprising
   guiding an elongated member through a plurality of rollers defining a closed geometry toward a take-up reel;
   rotating the take-up reel about a first axis for receiving the elongated member; and
   simultaneously oscillatingly rotating the take-up reel about a second axis for permitting even winding of the elongated member on the take-up reel.

15. An elongated member pulling device, comprising:
   a trailer having a support surface;
   a reel assembly for rotatably carrying a take-up reel about a first axis for receiving an elongated member, the reel assembly rotatable about the support surface about a second axis extending through the take-up reel;
   a guide device comprising two pairs of opposed rollers defining a closed rectangular geometry for guiding the elongated member toward the reel assembly, wherein at least one pair of rollers is adjustable for adjusting a size of the closed rectangular geometry;
   wherein in response to the elongated member being guidingly received through the guide device and rotatably collected by the take-up reel, the reel assembly being selectably oscillatingly rotatable about the second axis to permit even winding of the elongated member on the take-up reel; and
   a rotational drive source including a worm drive for oscillatingly rotatably driving the reel assembly.

16. The pulling device of claim 15, wherein the reel assembly and the guide device form a single structure.

17. The pulling device of claim 15, wherein the reel assembly is rotatable approximately 180 degrees relative to the support surface.

18. The pulling device of claim 15, wherein the guide device is vertically positionable outside a footprint of the support surface.

19. The pulling device of claim 15 further comprises an elongated support member having a first end connected to the reel assembly and an opposed second end having a rotatable guide member, wherein at least the second end is vertically positionable outside a footprint of the support surface.

20. The pulling device of claim 19, wherein an angle between the elongated support member and the support surface is adjustable.

* * * * *